US008927450B2

(12) United States Patent
Iijima et al.

(10) Patent No.: US 8,927,450 B2
(45) Date of Patent: Jan. 6, 2015

(54) RECLAIMING METHOD

(71) Applicants:Mitsubishi Heavy Industries, Ltd., Tokyo (JP); The Kansai Electric Power Co, Inc., Osaka (JP)

(72) Inventors: Masaki Iijima, Tokyo (JP); Masahiko Tatsumi, Amagasaki (JP); Yasuyuki Yagi, Hyogo (JP); Kouki Ogura, Amagasaki (JP)

(73) Assignees: Mitsubishi Heavy Industries, Ltd., Tokyo (JP); The Kansai Electric Power Co., Inc., Osaka-shi (JP)

( * ) Notice: Subject to any disclaimer, the term of this patent is extended or adjusted under 35 U.S.C. 154(b) by 0 days.

(21) Appl. No.: 13/843,228

(22) Filed: Mar. 15, 2013

(65) Prior Publication Data
US 2013/0206000 A1    Aug. 15, 2013

Related U.S. Application Data

(62) Division of application No. 12/752,405, filed on Apr. 1, 2010, now Pat. No. 8,425,849.

(30) Foreign Application Priority Data

Oct. 19, 2009 (JP) ................. 2009-240540

(51) Int. Cl.
  *B01J 38/06* (2006.01)
  *B01D 53/14* (2006.01)
  *B01D 19/00* (2006.01)
(52) U.S. Cl.
  CPC ........ *B01D 53/1425* (2013.01); *B01D 53/1412* (2013.01); *B01D 53/1462* (2013.01); *B01D 19/0005* (2013.01); *Y02C 10/06* (2013.01); *Y02C 10/08* (2013.01); *Y10S 502/517* (2013.01); *Y10S 502/518* (2013.01)
  USPC .............................. 502/55; 502/517; 502/518
(58) Field of Classification Search
  USPC ................ 502/55, 56, 514, 517, 518, 34, 349
  See application file for complete search history.

(56) References Cited

U.S. PATENT DOCUMENTS

| | | | |
|---|---|---|---|
| 3,554,690 A | 1/1971 | Mayland et al. | |
| 3,918,934 A | 11/1975 | Kriebel et al. | |
| 4,460,383 A | 7/1984 | Valerius | |
| 4,461,749 A | 7/1984 | Thorn | |
| 8,425,849 B2 | 4/2013 | Iijima et al. | |
| 8,603,226 B2 | 12/2013 | Garcia Andarcia et al. | |
| 2008/0203036 A1 | 8/2008 | Iijima et al. | |
| 2009/0155889 A1 | 6/2009 | Handagama et al. | |
| 2010/0115839 A1 | 5/2010 | Brown et al. | |
| 2010/0192770 A1 | 8/2010 | Andarcia et al. | |
| 2011/0092355 A1 | 4/2011 | Iijima et al. | |

FOREIGN PATENT DOCUMENTS

| | | |
|---|---|---|
| CN | 101301578 A | 11/2008 |
| EA | 009089 B1 | 10/2007 |
| EP | 1059109 A2 | 12/2000 |
| EP | 1059110 A1 | 12/2000 |
| JP | 49-057002 A | 6/1974 |
| JP | 5-245339 A | 9/1993 |
| RU | 2 122 888 C1 | 12/1998 |
| RU | 2 126 863 C1 | 2/1999 |
| RU | 2371237 C1 | 10/2009 |

OTHER PUBLICATIONS

European Search Report dated Feb. 2, 2011, issued in corresponding European Patent Application No. 10160471.8. (6 pp).
Official Decision of Grant dated dated Jun. 28, 2011, issued in corresponding Russian Patent Application No. 2010115798 and Substitute sheet of Official Decision of Grant correcting "EP 105109A2" to "EP 1059109 A2" error. (16 pp).
Notice of Allowance dated Sep. 6, 2012, issued in corresponding Canadian Patent Application No. 2,700,781 (1 pg).
Written Opinion for PCT/JP2011/066968, mailing date of Oct. 25, 2011.
International Search Report for PCT/JP2011/066968, mailing date of Oct. 25, 2011.
English Translation of Written Opinion of PCT/JP2011/066968, mailing date of Oct. 25, 2011. (6 pages).
Japanese Office Action dated Jul. 1, 2014, issued in related Japanese Patent Application No. 2010-196950, w/English translation (5 pages).
Austrailian Notice of Acceptance dated Jun. 23, 2014, issued in related Austrailian Patent Application No. 2011297370 (as counterpart of U.S. Appl. No. 13/703,211, 3 pages).
Russian Decision of Grant dated Jul. 9, 2014, issued in related Russian Patent Application No. 2013100167 (as counterpart of U.S. Appl. No. 13/703,211, 17 pages), w/English translation.
US Office Action dated Sep. 26, 2014, issued in corresponding U.S. Appl. No. 13/703,211, (33 pages).
TLV "Types of Steam", Jun. 12, 2011, All pages https ://web. archive.org/web/2011   0612154213/http://www.tlv   .com/global/TI/steam-theory/types-of-steam. html.
Efunda "Steam Tables" for 2 and 3 kg/cm"2, Sep. 20, 2014, all pages http://www.efunda.com/materials/water/steamtable_sat.cfm.

*Primary Examiner* — Edward Johnson
(74) *Attorney, Agent, or Firm* — Westerman, Hattori, Daniels & Adrian, LLP (57) ABSTRACT

A reclaiming apparatus 106 includes: a sealed container 106a that is an absorbent reservoir for storing therein a part of an absorbent that has absorbed $CO_2$ in flue gas, and a heater that heats the absorbent stored in the sealed container 106a. The reclaiming apparatus 106 distributes a part of the absorbent stored in the sealed container 106a, and brings the distributed absorbent into counter-current contact with steam. Because a part of the absorbent stored in the absorbent reservoir is brought into counter-current contact with the steam, absorbent component contained therein becomes volatilized, and is separated from depleted materials. In this manner, the absorbent component can be extracted from the depleted materials, and a loss of the absorbent can be reduced.

5 Claims, 8 Drawing Sheets

| | | |
|---|---|---|
| CONVENTIONAL EXAMPLE | ABSORBENT COMPONENT CONTAINED IN SLUDGE EJECTED AS RESULT OF RECLAIMING | 7.3 [wt%] |
| | AMOUNT OF SLUDGE EJECTED PER RECLAIMING | 19 TONS/TIME |
| | NUMBER OF RECLAIMING PERFORMED ANNUALLY | 3.8 TIMES/YEAR |
| | ANNUAL LOSS OF ABSORBENT DUE TO ABSORBENT COMPONENT CONTAINED IN SLUDGE | 5,993 KG/YEAR |
| | LOSS RATIO OF ABSORBENT COMPONENT CONTAINED IN SLUDGE WITH RESPECT TO ENTIRE AMOUNT OF ABSORBENT | 14.8 [%] |
| EMBODIMENT | ABSORBENT COMPONENT CONTAINED IN SLUDGE | 1.0 [%] |
| | ANNUAL ABSORBENT LOSS DUE TO ABSORBENT COMPONENT CONTAINED IN SLUDGE | 820 KG/YEAR |
| | ANNUAL REDUCTION IN ABSORBENT LOSS | 5,173 KG/YEAR |
| | ANNUAL ABSORBENT REDUCTION RATIO | 12.7 [%] |

RECLAIMING METHOD

CROSS-REFERENCE TO RELATED APPLICATIONS

This application is a Divisional of U.S. patent application Ser. No. 12/752,405, filed Apr. 1, 2010 which is based upon and claims the benefit of priority from the prior Japanese Patent Application No. 2009-240540, filed on Oct. 19, 2009, the entire contents of which are incorporated herein by reference.

TECHNICAL FIELD

The present invention relates to a reclaiming apparatus and a reclaiming method for reducing depleted materials contained in an absorbent that absorbs $CO_2$ or $H_2S$ in gas.

BACKGROUND ART

It has come to be pointed out that one of the causes of global warming is the greenhouse effect of $CO_2$, and it has become an urgent task on a global scale to provide countermeasures for $CO_2$ to protect the global environment against global warming. $CO_2$ is generated by a wide range of human activities combusting fossil fuels, and there is an increasing demand for suppressing $CO_2$ emissions. Along with such an increasing demand, researchers have been energetically studying methods for reducing and recovering $CO_2$ in combustion flue gas, and for storing recovered $CO_2$ without releasing it to the air, by bringing combustion flue gas emitted from boilers in contact with aqueous alkanolamine solution or the like, for applications in thermal plants and other power plants that consume a large amount of fossil fuels.

Japanese Patent Application Laid-open No. H5-245339 discloses a conventional method for reducing $CO_2$ (carbon dioxide) and SOX (sulfur oxide) contained in flue gas.

This method includes: removing NOX (nitrogen oxide) contained in flue gas by reducing the NOX; removing SOX contained in the flue gas by bringing the SOX in contact with calcium carbonate contained in slurry; removing $CO_2$ by bringing the flue gas having NOX and SOX thus removed into counter-current contact with an amine-based absorbent (aqueous alkanolamine solution) in an absorber, to cause the absorbent to absorb $CO_2$ contained in the flue gas; and regenerating the absorbent by reducing $CO_2$ in rich solution that has absorbed $CO_2$ to obtain lean solvent in a regenerator, and returning the lean solvent to the absorber. In this method, to prevent depleted materials from accumulating in a system through which the absorbent flows, reclaiming is performed in a reclaimer to heat the absorbent and to cause the depleted materials to be concentrated into sludge, and to reduce the depleted materials contained therein. The depleted materials contain: heat stable salts resulting from degradation of alkanolamine, caused by oxidation due to oxygen contained in the flue gas; heat stable salts resulting from alkanolamine reacting with the remaining NOX or SOX; and solid substances such as soot and dust contained in the flue gas.

CITATION LIST

Patent Literature

[PATENT LITERATURE 1] Japanese Patent Application Laid-open No. H5-245339

SUMMARY OF INVENTION

Technical Problem

In the conventional reclaiming, the absorbent containing the depleted materials is heated to cause the depleted materials to be concentrated and to be collected as the sludge, and the absorbent component contained therein is evaporated and returned to the regenerator. In this manner, the depleted materials are prevented from accumulating in the system through which the absorbent flows. However, in such reclaiming process that depends only on heating and evaporation, some part of the absorbent component may not evaporate and remain in the sludge. This can result in a loss of the absorbent, and the lost amount of the absorbent needs to be compensated. The absorbent component remaining in the sludge can occupy 5 to 20 percent of the entire absorbent, for example. Because alkanolamine that is the absorbent component is expensive, it is important, from the perspective of reducing an operation cost of the reclaiming apparatus, to reduce the loss.

The present invention is made to solve the problem described above, and an object of the present invention is to provide a reclaiming apparatus and a reclaiming method that can further separate the absorbent component from the depleted materials, and reduce a loss of the absorbent.

Solution to Problem

According to an aspect of the present invention, a reclaiming apparatus includes: an absorbent reservoir that stores therein a part of an absorbent that has absorbed $CO_2$ or $H_2S$ in gas; and a heater that heats the absorbent stored in the absorbent reservoir. The part of the absorbent stored in the absorbent reservoir is distributed, and is brought into counter-current contact with steam.

Because this reclaiming apparatus brings a part of the absorbent stored in the absorbent reservoir into counter-current contact with the steam, the absorbent component contained therein volatilizes, and becomes separated from depleted materials. In this manner, the absorbent component can be extracted from the depleted materials, and a loss of the absorbent can be reduced.

A general reclaiming apparatus starts heating the absorbent at approximately 120 degrees Celsius, and the temperature is increased to, for example, 150 degrees Celsius, depending on a concentrating frequency of the depleted materials. Therefore, steam of a higher pressure is required at a heat source of the heater. Furthermore, the absorbent component in the absorbent may deteriorate due to the heat accompanying the increased heating temperature. To address such an issue, the reclaiming apparatus according to the present invention brings the absorbent stored in the absorbent reservoir into counter-current contact with the steam to separate the absorbent component from the depleted materials. Because the depleted materials are concentrated by way of this counter-current contact, the heating temperature, required for concentrating the depleted materials, can be suppressed, and the pressure increase in the heating source can also be suppressed. Moreover, because the heating temperature can be suppressed, the amount of the absorbent component deteriorated by the heating can also be reduced. Furthermore, because the depleted materials can be concentrated at the lower heating temperature in the heater, the depleted materials can be concentrated more efficiently, thus the size of the reclaiming apparatus can be reduced.

Advantageously, the reclaiming apparatus further includes: an absorbent distributing unit that forms a circulating mechanism that distributes the absorbent by extracting a part of the absorbent stored in the absorbent reservoir, and returning the part of the absorbent to the absorbent reservoir; a steam supplying unit that generates steam from the absorbent heated by the heater; and an absorbent component extracting unit that is arranged in the absorbent reservoir, and brings the absorbent to be returned to the absorbent reservoir into counter-current contact with the steam generated by the steam supplying unit.

This reclaiming apparatus uses the steam generated from the absorbent heated with the heater for concentrating the depleted materials contained in the absorbent. In this manner, the same heat source can be shared among the process for concentrating the depleted materials and the process for separating the absorbent component from the depleted materials. The facility cost can be reduced accordingly. Furthermore, because, in this reclaiming apparatus, both of the absorbent distributing unit and the steam supplying unit can use the structures of the absorbent reservoir and the heater, the facility cost can further be reduced.

Advantageously, the reclaiming apparatus further includes: an absorbent distributing unit that extracts and distributes a part of the absorbent stored in the absorbent reservoir; a steam supplying unit that supplies steam generated outside of the reclaiming apparatus; and an absorbent component extracting unit that brings the absorbent extracted by the absorbent distributing unit into counter-current contact with the steam supplied by the steam supplying unit.

Because this reclaiming apparatus uses the steam not containing the absorbent component, the absorbent component can be separated from the depleted materials more efficiently.

Advantageously, the reclaiming apparatus further includes a packed bed in which the absorbent is brought into gas-liquid contact with the steam.

This reclaiming apparatus can further promote the separation of the absorbent component from the depleted materials contained in the absorbent.

Advantageously, the reclaiming apparatus further includes: a pump that extracts and pumps up a part of the absorbent from the absorbent reservoir; and a nozzle that allows the absorbent pumped up by the pump to flow down in an opposing manner to the steam that is rising.

In this reclaiming apparatus, the absorbent stored in the absorbent reservoir can be brought in counter-current contact with the steam as required.

According to another aspect of the present invention, a reclaiming method includes: storing a part of an absorbent that has absorbed CO2 or H2S in gas; heating the absorbent thus stored; and distributing and bringing the part of the absorbent thus stored into counter-current contact with steam.

In this reclaiming method, because a part of the absorbent stored in the absorbent reservoir is brought into counter-current contact with the steam, the absorbent component contained therein volatilizes, and becomes separated from depleted materials. In this manner, the absorbent component can be extracted from the depleted materials, and a loss of the absorbent can be reduced.

In a general reclaiming method, heating of the absorbent is started approximately at 120 degrees Celsius, and the temperature is increased to, for example, 150 degrees Celsius depending on a concentrating frequency of the depleted materials. Therefore, steam of a higher pressure is required at a heat source of the heater. Furthermore, the absorbent component in the absorbent may deteriorate due to the heat accompanying the increase in the heating temperature. To address such an issue, the reclaiming apparatus according to the present invention brings the absorbent stored in the absorbent reservoir into counter-current contact with the steam to separate the absorbent component from the depleted materials. Because the depleted materials are concentrated by way of this counter-current contact, the heating temperature, required for concentrating the depleted materials, can be suppressed, and the pressure increase at the heating source can also be suppressed. Moreover, because the heating temperature can be suppressed, the amount of the absorbent component deteriorated by the heating can also be reduced. Furthermore, because the depleted materials are allowed to concentrate at the lower heating temperature in the heater, the depleted materials can be concentrated more efficiently, thus the size of the reclaiming apparatus can be reduced.

Advantageously, the reclaiming method further includes: circulating a part of the absorbent thus stored to distribute the absorbent; and bringing the absorbent thus circulated into counter-current contact with steam generated by heating the absorbent.

In this reclaiming method, because the steam generated from the absorbent heated with the heater for concentrating the depleted materials contained in the absorbent is used, the same heat source can be shared among the process for concentrating the depleted materials and the process for separating the absorbent component from the depleted materials. The facility cost can be reduced accordingly.

Advantageously, the reclaiming method further includes: extracting and distributing a part of the absorbent thus stored; and brining the absorbent thus extracted into counter-current contact with steam generated externally.

In this reclaiming method, because the steam not containing the absorbent component is used, the absorbent component can be separated from the depleted materials more efficiently.

Advantageously, the reclaiming method further includes: measuring an amount of an absorbent component contained in the absorbent by sampling the stored absorbent; and ending each of the preceding steps when the amount of the absorbent component thus measured becomes equal to or less than a predetermined value.

In this reclaiming method, because reclaiming is ended based on the amount of the absorbent component contained in the stored absorbent, the absorbing capacity of the absorbent can be constantly maintained to a stable level.

Advantageously, in the reclaiming method, the heating further includes allowing the absorbent and steam to exchange heat in a non-contact manner to maintain a pressure of the steam to a predetermined level.

In this reclaiming method, because the pressure of the steam in the heating source can be kept constant by keeping the pressure of the steam for heating the stored absorbent at a predetermined level, the amount of the absorbent component deteriorated by the heating can be reduced, and the size of the reclaiming apparatus can be reduced.

Advantageous Effects of Invention

According to the present invention, the absorbent component can be further separated from the depleted materials, and a loss of the absorbent can be reduced.

DESCRIPTION OF EMBODIMENTS

Embodiments of the present invention will now be explained in detail with reference to the attached drawings. The embodiments described herein are not intended to limit the scope of the present invention in any way. Furthermore, elements disclosed in the embodiment include those that can be replaced or that are easily replaceable by those skilled in the art, and those that are substantially identical.

Example 1

Figure 1:
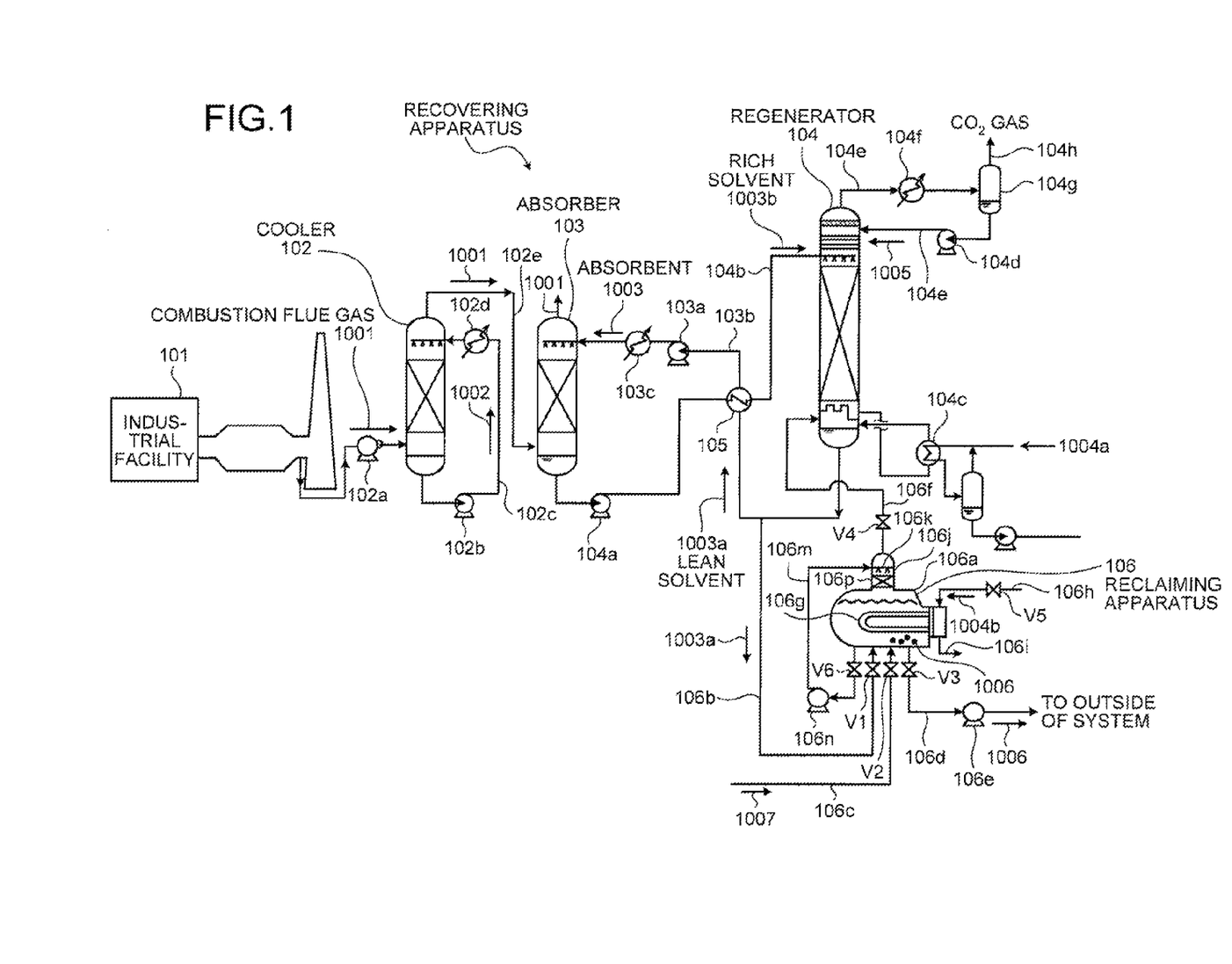
FIG. 1 is a schematic of a recovering apparatus to which a reclaiming apparatus according to a first embodiment of the present invention is applied.

Coal-gasified gas, synthesis gas, coke-oven gas, petroleum gas, natural gas, and the like contain CO2 (carbon dioxide) and H2S (hydrogen sulfide). As shown in FIG. 1, a recovering apparatus that recovers such CO2 (carbon dioxide) or H2S (hydrogen sulfide), or recovers CO2 (carbon dioxide) from combustion flue gas (hereinafter, simply referred to as "flue gas") includes: a cooler 102 that cools flue gas 1001 emitted from an industrial facility 101, such as a boiler, with cooling water 1002; an absorber 103 that brings the flue gas 1001 into counter-current contact with an amine-based absorbent 1003 (lean solvent 1003a), e.g., aqueous alkanolamine solution, that absorbs CO2, to cause the absorbent 1003 to absorb CO2 contained in the flue gas 1001, and releases the flue gas 1001 having CO2 reduced; and a regenerator 104 that regenerates the absorbent 1003 (rich solvent 1003b) that has absorbed CO2.

In the cooler 102, a flue gas blower 102a boosts the pressure of the flue gas 1001 containing CO2, and the flue gas 1001 is then sent into the cooler 102. The flue gas 1001 is then cooled by being brought into counter-current contact with the cooling water 1002 (flue gas cooling). The cooling water 1002 is reserved in the lower area of the cooler 102, and is supplied to an upper area of the cooler 102 by way of a humidifying cooling water circulating pump 102b via an external cooling water pipe 102c provided outside the cooler 102. While moving to the lower area of the cooler 102, the cooling water 1002 is brought into counter-current contact with the flue gas 1001. To the cooling water pipe 102c, a cooling unit 102d for cooling the cooling water 1002 is provided. The cooled flue gas 1001 is released out of the cooler 102 via a flue gas pipe 102e, and supplied to the absorber 103.

In the absorber 103, the flue gas 1001 is brought into counter-current contact with the alkanolamine-based absorbent 1003 (lean solvent 1003a) to cause the absorbent 1003 to absorb CO2 contained in the flue gas 1001. In this manner, CO2 in the flue gas 1001 is reduced (CO2 removal). The flue gas 1001 having CO2 reduced is released from the absorber 103. The absorbent 1003 (lean solvent 1003a) is compression-transported from the regenerator 104 by way of an absorbent supplying pump 103a, and supplied from the outside of the absorber 103 into an upper area of the absorber 103 via a lean solvent pipe 103b. While moving to the lower area of the absorber 103, the absorbent 1003 is brought into counter-current contact with the flue gas 1001. To the lean solvent pipe 103, a cooling unit 103c for cooling the absorbent 1003 that is to be supplied to the absorber 103 is provided. The absorbent 1003 (rich solvent 1003b) that has absorbed CO2 is reserved at the lower area of the absorber 10, and is transported via a rich solvent pipe 104b to be ejected out of the absorber 103. The absorbent 1003 is then compression-transported by an absorbent ejecting pump 104a, and supplied to the upper area of the regenerator 104.

In the regenerator 104, the absorbent 1003 that is the rich solvent 1003b is turned into semi-lean solvent that is the rich solvent that has released the major part of CO2 by way of an endothermic reaction. This semi-lean solvent is turned into the lean solvent 1003a that is the semi-lean solvent that has almost all of CO2 reduced, by the time the semi-lean solvent reaches the lower area of the regenerator 104.

In the lower area of the regenerator 104, a regenerating heater 104c heats and regenerates the lean solvent 1003a by way of saturated steam 1004a. The regenerated lean solvent 1003a is transported via the lean solvent pipe 103, and ejected out of the regenerator 104. In the rich/lean heat exchanger 105, the lean solvent 1003a to be supplied into the absorber 103 is cooled by way of a heat exchange with the rich solvent 1003b to be supplied to the regenerator 104 via the rich solvent pipe 104b (absorbent regeneration).

In the upper area of the regenerator 104, CO2 gas separated from the rich solvent 1003b and the semi-lean solvent is brought into contact with circumfluent water 1005 that is compression-transported from outside of the regenerator 104 by the circumfluent water pump 104d, and is released out of the regenerator 104 from the top thereof, via the circumfluent pipe 104e. CO2 gas being transported via the circumfluent pipe 104e is cooled by a regenerator circumfluent cooling unit 104f. Then, moisture contained in the CO2 gas is condensed so that the CO2 gas is separated from the circumfluent water 1005 in a CO2 separator 104g. The CO2 gas is then guided to CO2 recovery via a recovered CO2 releasing pipe 104h. The circumfluent water 1005 separated from CO2 in the CO2 separator 104g is compression-transported by the circumfluent water pump 104d, and is supplied to the regenerator 104 via the circumfluent pipe 104e.

Although not shown in FIG. 1, a NOX removing apparatus and a SOX removing apparatus are arranged between the industrial facility 101 and the cooler 102 included in the recovering apparatus. The NOX removing apparatus performs NOX removal in which NOX (nitrogen oxide) contained in the flue gas 1001 is removed by reduction. The SOX removing apparatus performs SOX removal in which SOX (sulfur oxide) contained in the flue gas 1001 is removed by bringing the SOX in contact with calcium carbonate contained in slurry.

In the recovering apparatus described above, upon recovering CO2 contained in the flue gas 1001, oxygen deteriorates alkanolamine, and produces heat stable salts. In addition, remaining NOX that was not removed at the NOX removal or remaining SOX that was not removed at the SOX removal react with alkanolamine contained in the CO2 absorbent 1003 at the CO2 removal to produce heat stable salts. The heat stable salt is contained in the absorbent 1003 as depleted materials together with the solid substances such as dust and soot contained in the flue gas. The solid substances cannot be removed under a normal condition, at the absorbent regeneration in which the lean solvent 1003a is regenerated from the rich solvent 1003b. As a result, the absorbent 1003 containing the depleted materials circulate through the system of the recovering apparatus, and the depleted materials gradually accumulates in the system. Therefore, the recovering apparatus includes a reclaiming apparatus 106 that reclaims the depleted materials remaining in the lean solvent 1003a generated in the regenerator 104 as sludge (concentrated waste) 1006 that is heated to be concentrated.

The reclaiming apparatus 106 extracts the lean solvent 1003a from a part of the lean solvent pipe 103b covering an area between the regenerator 104 and the rich/lean heat exchanger 105, and heats the lean solvent 1003a at 120 to 150 degrees Celsius, for example, and the absorbent 1003 that is gasified from the lean solvent 1003a is returned to the lower area of the regenerator 104, and the sludge 1006 concentrated by heating is ejected.

Figure 2:
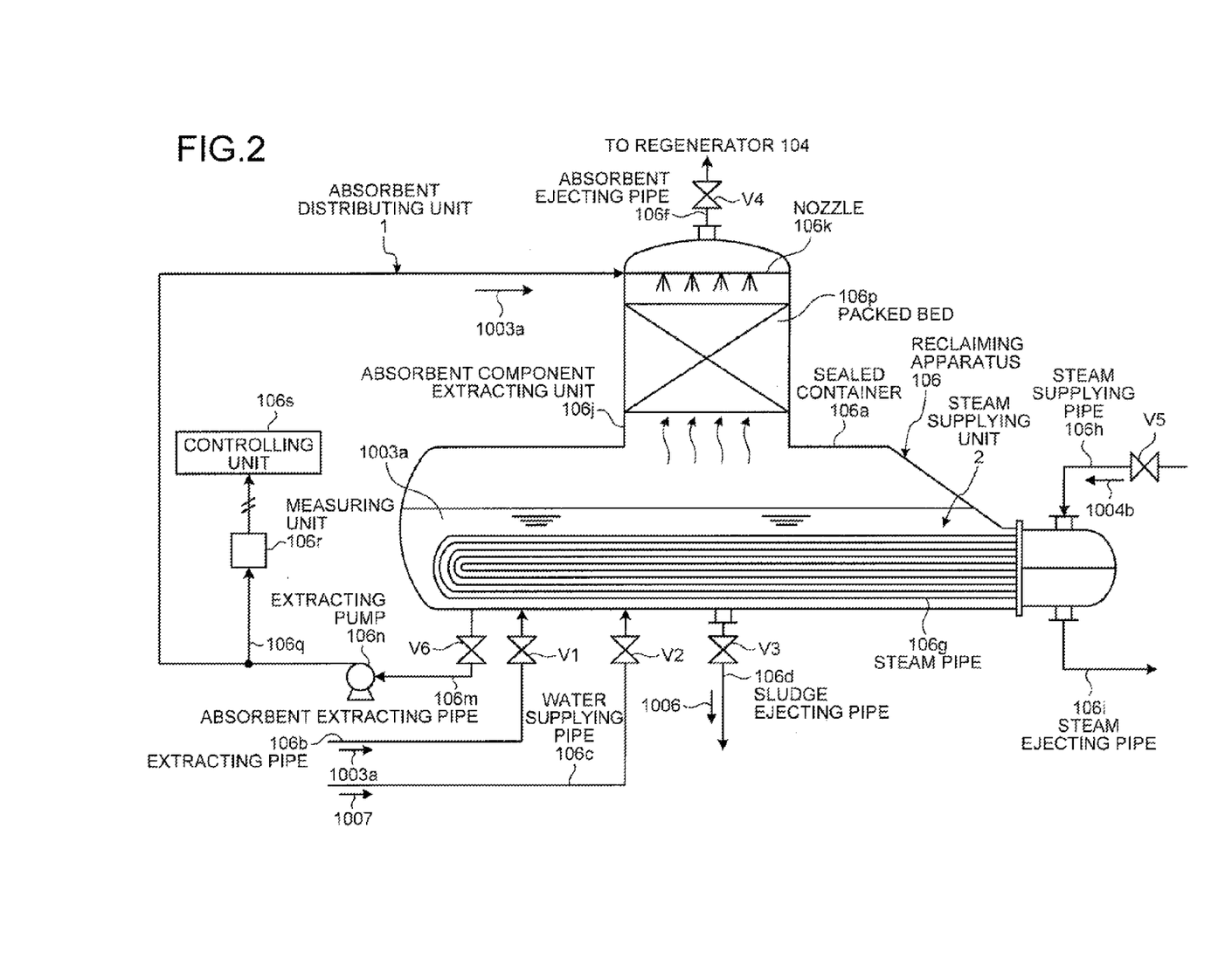
FIG. 2 is a schematic of the reclaiming apparatus according to the first embodiment of the present invention.

The reclaiming apparatus 106 mainly includes an absorbent reservoir and a heater. As shown in FIGS. 1 and 2, the absorbent reservoir serves as a sealed container 106a for extracting and reserving part of the absorbent 1003 that has recovered CO2 from the flue gas. The sealed container 106a is connected to the lean solvent pipe 103 via an extracting pipe 106b, provided between the regenerator 104 and the rich/lean heat exchanger 105. An open and shut valve V1 is provided to the extracting pipe 106b. A water supplying pipe 106c for transporting diluting water 1007 is connected to the sealed container 106a. An open and shut valve V2 is provided to the water supplying pipe 106c. A sludge ejecting pipe 106d for ejecting the sludge 1006 is also connected to the sealed container 106a. An open and shut valve V3 and a sludge ejecting pump 106e are provided to the sludge ejecting pipe 106d. An absorbent ejecting pipe 106f, connected to the lower area of the regenerator 104, is connected to the upper area of the sealed container 106a. An open and shut valve V4 is provided to the absorbent ejecting pipe 106f.

The heater is arranged inside the sealed container 106a, and includes: laterally-arranged U-shaped steam pipes 106g; a steam supplying pipe 106h that is connected to one end of each of the steam pipes 106g and through which saturated steam 1004b, generated outside of the sealed container 106a by the heating by a heat source not shown, is supplied; and a steam ejecting pipe 106i that is connected to the other end of each of the steam pipes 106g and through which the saturated steam 1004b is ejected outside of the sealed container 106a. An open and shut valve V5 is provided to the steam supplying pipe 106h.

The reclaiming apparatus 106 opens the open and shut valve V1 to supply the lean solvent 1003a into the sealed container 106a; opens the open and shut valve V2 to supply the diluting water 1007 into the sealed container 106a; and opens the open and shut valve V5 to let the saturated steam 1004b into the steam pipe 106g so that the supplied lean solvent 1003a and the diluting water 1007 are heated at, for example, 120 to 150 degrees Celsius through non-contact heat exchange with the saturated steam 1004b. The depleted materials contained in the lean solvent 1003a are thus concentrated onto the bottom of the sealed container 106a as the sludge 1006. By opening the open and shut valve V3, and operating the sludge ejecting pump 106e, the sludge 1006 is ejected out of the sealed container 106a. The sludge 1006 ejected out of the sealed container 106a is collected outside the system of the recovering apparatus. The collected sludge 1006 is then incinerated. The lean solvent 1003a and the diluting water 1007 are evaporated by the heating. The evaporated lean solvent 1003a passes through the opened open and shut valve V4, to be returned to the regenerator 104 via the absorbent ejecting pipe 106f. In this manner, the depleted materials are separated from the lean solvent 1003a, to prevent the depleted materials from accumulating in the system of the recovering apparatus.

However, the reclaiming only depending on the heating may not cause the absorbent component to evaporate completely, and may cause part thereof to remain in the sludge. Therefore, the absorbent may be lost.

Thus, the reclaiming apparatus 106 according to the first embodiment includes, as shown in FIGS. 1 and 2, an absorbent component extracting unit 106j, a nozzle 106k, an absorbent extracting pipe 106m, an open and shut valve V6, an extracting pump 106n, and a packed bed 106p.

The absorbent component extracting unit 106j is arranged in an upper area of the sealed container 106a. The bottom of the absorbent component extracting unit 106j is communicated to the sealed container 106a. The top of the absorbent component extracting unit 106j is sealed to form a part of the sealed container 106a, and is formed to swell upwardly from the top of the sealed container 106a. The absorbent ejecting pipe 106f is connected to the top of the absorbent component extracting unit 106j. The nozzle 106k is arranged in an upper area of the absorbent component extracting unit 106j. The nozzle 106k is connected to the bottom of the sealed container 106a via the absorbent extracting pipe 106m. The open and shut valve V6 and the extracting pump 106n are provided to the absorbent extracting pipe 106m. The packed bed 106p is disposed below the nozzle 106k in the absorbent component extracting unit 106j.

The reclaiming apparatus 106 opens the open and shut valve V6 and operates the extracting pump 106n to supply a part of the lean solvent 1003a containing the depleted materials to the nozzle 106k from the sealed container 106a via the absorbent extracting pipe 106m, and the lean solvent 1003a is injected from the nozzle 106k into the absorbent component extracting unit 106j, and flows down in the absorbent component extracting unit 106j. In other words, the absorbent extracting pipe 106m, the open and shut valve V6, the extracting pump 106n, and the nozzle 106k form an absorbent distributing unit 1 that functions as a circulating mechanism that extracts a part of the CO2 absorbent reserved in the sealed container 106a that is an absorbent reservoir, and returns the absorbent into the sealed container 106a via the absorbent component extracting unit 106j.

When the open and shut valve V5 is opened to let the saturated steam 1004b flow through the steam pipe 106g to heat the lean solvent 1003a, the lean solvent 1003a stored in the sealed container 106a evaporates and rises into the absorbent component extracting unit 106j in the form of steam. The rising steam of the lean solvent 1003a is then brought into counter-current contact with the lean solvent 1003a flowing down from the nozzle 106k at the position of the packed bed 106p. In other words, the sealed container 106a, the steam pipe 106g, the steam supplying pipe 106h, the steam ejecting pipe 106i, and the open and shut valve V5 form a steam supplying unit 2 that supplies steam into the absorbent component extracting unit 106j in the direction opposing to the direction in which the absorbent distributing unit 1 distributes the absorbent 1003.

Figure 3A:
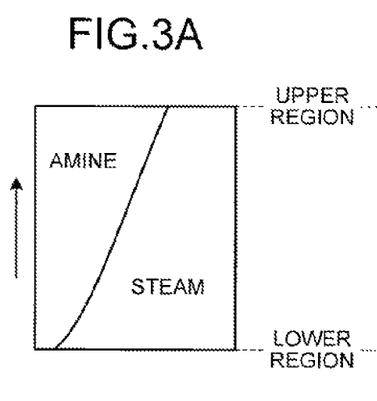
FIGS. 3A and 3B are illustrative diagrams of an effect of the reclaiming apparatus according to the first embodiment of the present invention.
Figure 3B:
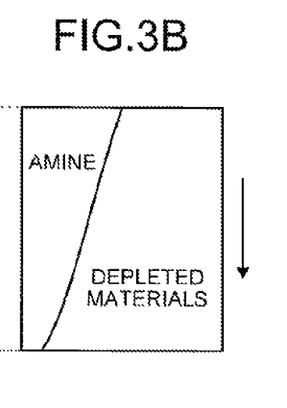

The lean solvent 1003a flowing down from the nozzle 106k is brought into counter-current contact with the steam of the lean solvent 1003a rising from the sealed container 106a, and causes the absorbent component contained therein to volatilize. In other words, as shown in FIG. 3A, the steam rises from the lower region to the upper region, and is brought into counter-current contact with the absorbent 1003 (lean solvent 1003a) to cause the absorbent component (amine) contained in the gas to volatilize, thereby extracting the absorbent component from the absorbent 1003 (lean solvent 1003a). As shown in FIG. 3B, the absorbent 1003 (lean solvent 1003a) flows down from the upper region to the lower region, and is brought into counter-current contact with the steam so that the absorbent component (amine) contained in the liquid is volatilized to be separated from the depleted materials. In this manner, the volatilized absorbent component is separated from the depleted materials, passes through the opened open and shut valve V4, and returns to the regenerator 104 via the absorbent ejecting pipe 106f.

The packed bed 106p is suited for bringing the lean solvent 1003a flowing down from the nozzle 106k into gas-liquid contact with the steam of the lean solvent 1003a rising from the sealed container 106a in the absorbent component extracting unit 106j so that the absorbent component is volatilized to be separated from the depleted materials. A packed bed 106p includes a packed bed structure filled with fillers such as ball rings or cascade rings. The packed bed 106p is preferably included in the reclaiming apparatus 106; however, even without the packed bed 106p, the absorbent component can be separated from the depleted materials by bringing the lean solvent 1003a flowing down from the nozzle 106k into counter-current contact with the steam of the lean solvent 1003a rising from the sealed container 106a in the absorbent component extracting unit 106j.

The reclaiming apparatus 106 according to this embodiment also includes a collecting unit 106q that collects (samples) a part of the absorbent 1003 (lean solvent 1003a) that is stored in the sealed container 106a. The collecting unit 106q is connected to the absorbent extracting pipe 106m, at a position following the extracting pump 106n. The collecting unit 106q includes a measuring unit 106r that measures the amount of the absorbent component contained in the collected absorbent 1003 (lean solvent 1003a). Measurement information measured by the measuring unit 106r is output to a controlling unit 106s. The collecting unit 106q may also sample the absorbent 1003 (lean solvent 1003a) from the sealed container 106a, instead of via the absorbent extracting pipe 106m.

Figure 4:
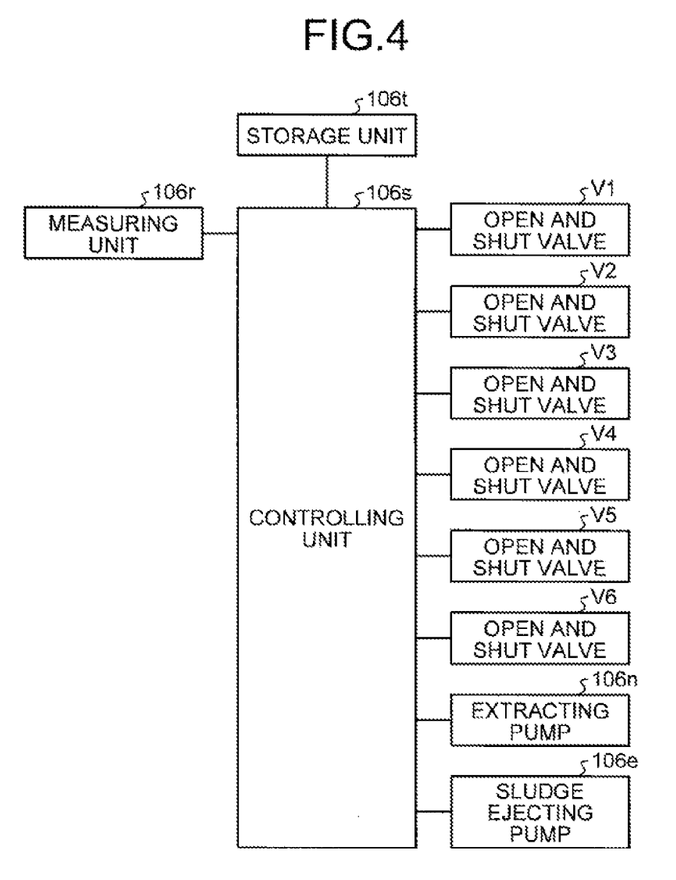
FIG. 4 is a block diagram of a controlling system included in the reclaiming apparatus according to the first embodiment of the present invention.

The controlling unit 106s is, for example, a microcomputer. As shown in FIG. 4, a storage unit 106t is provided to the controlling unit 106s. The storage unit 106t is, for example, a random-access memory (RAM) or a read-only memory (ROM), and stores therein programs and data. To operate the reclaiming apparatus, the storage unit 106t stores therein data of the amount of an absorbent component contained in the absorbent 1003 (lean solvent 1003a) that is stored in the sealed container 106a. For example, such data specifies the amount of the absorbent component contained in the absorbent 1003 (lean solvent 1003a) to be 5 weight percent. This setting functions as an index indicating how much absorbent component has decreased in the absorbent 1003 (lean solvent 1003a) that is stored in the sealed container 106a, and can be set to any value. The controlling unit 106s is connected to the measuring unit 106r, the open and shut valves V1 to V6, and the pumps 106e and 106n. The controlling unit 106s controls the overall operations of the open and shut valves V1 to V6 and the pumps 106e and 106n, based on concentration information received from the measuring unit 106r, and according to the programs and the data stored in the storage unit 106t in advance.

Figure 5:
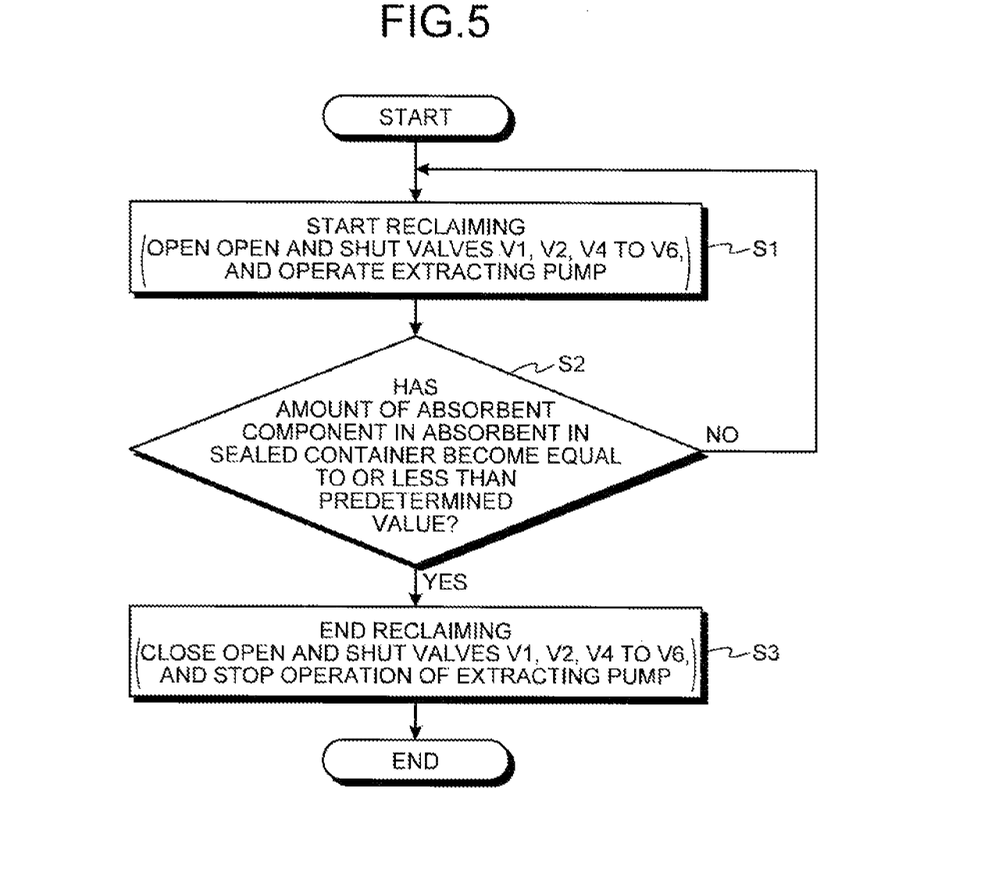
FIG. 5 is a flowchart of a control performed by the reclaiming apparatus according to the first embodiment of the present invention.

As shown in FIG. 5, the controlling unit 106s opens the open and shut valves V1, V2, and V4 to V6, and operates the extracting pump 106n, based on a reclaiming initiating command (Step S1). Thus, a part of the absorbent 1003 (lean solvent 1003a) is transported from the regenerator 104 to the sealed container 106a to be stored therein, and is heated to evaporate together with the diluting water 1007, and then is returned to the regenerator 104 via the absorbent ejecting pipe 106f. While flowing down from the nozzle 106k, the absorbent 1003 (lean solvent 1003a) stored in the sealed container 106a is brought into counter-current contact with the steam of the absorbent 1003 (lean solvent 1003a) rising in the absorbent component extracting unit 106j from the sealed container 106a, and is volatilized. The absorbent 1003 (lean solvent 1003a) is then returned to the regenerator 104 via the absorbent ejecting pipe 106f. As a result, the absorbent component can be separated and extracted from the depleted materials. Based on the measurement information received from the measuring unit 106r, when the amount of the absorbent component contained in the absorbent 1003 (lean solvent 1003a) stored in the sealed container 106a becomes equal to or less than a predetermined value (e.g., 5 weight percent) (Yes at Step S2), the controlling unit 106s closes the open and shut valves V1, V2, and V4 to V6, and stops the operation of the extracting pump 106n, to end the reclaiming (Step S3). After the reclaiming is ended, the open and shut valve V3 is opened, and the sludge ejecting pump 106e is operated, to eject the sludge 1006 out of the sealed container 106a.

As described above, the reclaiming apparatus 106 according to the first embodiment includes: the sealed container 106a that is the absorbent reservoir for storing therein a part of the absorbent 1003 that has absorbed CO2 contained in the flue gas 1001; and the heater that heats the absorbent 1003 stored in the sealed container 106a. A part of the absorbent 1003 stored in the sealed container 106a is distributed and brought into counter-current contact with the steam.

In this reclaiming apparatus 106, because a part of the absorbent 1003 stored in the sealed container 106a is brought into counter-current contact with the steam, the absorbent component volatilizes to be separated from the depleted materials. In this manner, the absorbent component can be extracted from the depleted materials to reduce a loss of the absorbent 1003.

In a general reclaiming apparatus, heating of the absorbent 1003 is started at approximately 120 degrees Celsius, and the temperature is increased to, for example, 150 degrees Celsius, depending on a concentrating frequency of the depleted materials. Therefore, the pressure of the steam to be passed through the steam pipe 106g that is the heater must be increased, thus requiring a higher pressure steam at the heating source. Furthermore, alkanolamine that is the absorbent component contained in the absorbent 1003 may deteriorate due to the heat accompanying the increase in the heating temperature. To address such an issue, the reclaiming apparatus 106 according to the first embodiment brings the absorbent 1003 stored in the sealed container 106a into counter-current contact with the steam to separate the absorbent component from the depleted materials. Because the depleted materials are concentrated by way of this counter-current contact, the heating temperature, required for concentrating the depleted materials, can be suppressed, and the pressure increase in the heater can also be suppressed. Therefore, the pressure of the steam in the heating source can also be suppressed. Moreover, because the heating temperature can be suppressed, the amount of the absorbent component deteriorated by the heating can also be reduced. Furthermore, because the depleted materials can be concentrated at the lower heating temperature in the heater, the depleted materials can be concentrated more efficiently, thus the size of the reclaiming apparatus 106 can be reduced.

Furthermore, the reclaiming apparatus 106 according to the first embodiment includes: the absorbent distributing unit 1 that functions as the circulating mechanism that extracts a part of the CO2 absorbent reserved in the sealed container 106a, and returns the absorbent into the sealed container 106a; the steam supplying unit 2 that generates steam from the absorbent 1003 heated by the heater; and the absorbent component extracting unit 106j that is included in the sealed container 106a and brings the absorbent 1003 returning to the sealed container 106a into counter-current contact with the steam generated by the steam supplying unit 2.

In such a reclaiming apparatus 106, the steam generated by heating the absorbent 1003 for concentrating the depleted materials contained in the absorbent 1003, is used. In this manner, the same heat source can be shared among the process for concentrating the depleted materials and the process for separating the absorbent component from the depleted materials, thus reducing the facility cost. Furthermore, because, in the reclaiming apparatus 106, both of the absorbent distributing unit 1 and the steam supplying unit 2 can use the structures of the sealed container 106a and the heater, the facility cost can further be reduced.

Furthermore, the reclaiming apparatus 106 according to the first embodiment further includes the packed bed 106p in which the absorbent 1003 distributed by the absorbent distributing unit 1 is brought into gas-liquid contact with the steam.

This reclaiming apparatus 106 can further promote the separation of the absorbent component from the depleted materials contained in the absorbent 1003.

Furthermore, in the reclaiming apparatus 106 according to the first embodiment, the absorbent distributing unit 1 includes: the extracting pump 106n that extracts and pumps up a part of the absorbent 1003 from the seated sealed container 106a; and the nozzle 106k that allows the absorbent 1003 pumped up by the extracting pump 106n to flow down and be brought into counter-current contact with the rising steam.

In this reclaiming apparatus 106, the absorbent 1003 stored in the sealed container 106a can be brought into counter-current contact with the steam as required.

Furthermore, the reclaiming apparatus 106 according to the first embodiment further includes: the measuring unit 106r that measures the amount of the absorbent component contained in the absorbent 1003 stored in the sealed container 106a; and the controlling unit 106s that ends reclaiming when the amount of the absorbent component measured by the measuring unit 106r becomes equal to or less than a predetermined value.

Because the reclaiming apparatus 106 ends reclaiming based on the amount of the absorbent component contained in the absorbent 1003 stored in the sealed container 106a, the absorbing capacity of the absorbent 1003 can be constantly maintained to a stable level.

In the reclaiming apparatus 106, upon starting reclaiming, the open and shut valves V1, V2, and V4 to V6 are opened, and the extracting pump 106n is operated. In this manner, the absorbent 1003 (lean solvent 1003a) is heated and evaporates, while the absorbent component is volatilized. Therefore, the reclaiming efficiency can be improved.

Alternatively, in the reclaiming apparatus 106, upon starting reclaiming, the open and shut valves V1, V2, V4, and V5 may be opened at first to heat and evaporate the absorbent 1003 (lean solvent 1003a); and then the V6 may be opened and the extracting pump 106n may be operated to cause the absorbent component to volatilize. In this manner, the absorbent 1003 (lean solvent 1003a) containing 3-weight percent of the absorbent component at the time of heating can be concentrated to the absorbent 1003 containing 5-weight percent of the absorbent component, for example, by way of the heating and the evaporation. Because the absorbent 1003 thus concentrated is brought into counter-current contact with the steam, it is possible to increase the amount of the volatilized absorbent component, and to separate the absorbent component from the depleted materials more efficiently.

The reclaiming method according to the first embodiment includes: storing a part of the absorbent 1003 that has absorbed CO2 contained in the flue gas 1001; heating the absorbent 1003 thus stored in the sealed container 106a; and distributing a part of the stored absorbent 1003 to bring the absorbent 1003 into counter-current contact with steam.

In this reclaiming method, because the part of the stored absorbent 1003 is brought into counter-current contact with the steam, the absorbent component volatilizes to be separated from the depleted materials. In this manner, the absorbent component can be extracted from the depleted materials. Therefore, a loss of the absorbent 1003 can be reduced.

In a general reclaiming method, heating of the absorbent 1003 is started approximately at 120 degrees Celsius, and the temperature is increased to, for example, 150 degrees Celsius depending on a concentrating frequency of the depleted materials. Therefore, the pressure of the steam to be passed through the steam pipe 106g that is the heater must be increased, thus requiring a higher pressure steam at the heating source. Furthermore, alkanolamine that is the absorbent component in the absorbent 1003 may deteriorate due to the heat accompanying the increase in the heating temperature. To address such an issue, in the reclaiming method according to the first embodiment, the absorbent 1003 stored in the sealed container 106a is brought into counter-current contact with the steam to separate the absorbent component contained therein from the depleted materials and to cause the depleted materials to be concentrated. In this manner, the heating temperature required for concentrating the depleted materials can be suppressed, and the pressure increase in the heater can also be suppressed. Therefore, the pressure of the steam in the heating source can also be suppressed. Moreover, because the heating temperature can be suppressed, the amount of the absorbent component deteriorated by the heating can also be reduced. Furthermore, because the depleted materials can be concentrated at the lower heating temperature in the heater, the depleted materials can be concentrated more efficiently, thus the size of the reclaiming apparatus can be reduced.

The reclaiming method according to the first embodiment further includes: circulating a part of the stored absorbent 1003 to distribute the absorbent 1003; and bringing the steam of the heated absorbent 1003 into counter-current contact with the circulated absorbent 1003.

In this reclaiming method, because the steam, generated from the absorbent 1003 upon being heated for concentrating the depleted materials contained in the absorbent 1003 is used, the same heat source can be shared among the process for concentrating the depleted materials and the process for separating the absorbent component from the depleted materials. The facility cost can be reduced accordingly.

The reclaiming method according to the first embodiment further includes: sampling the stored absorbent 1003 to measure the amount of the absorbent component contained therein; and ending reclaiming when the amount of the absorbent component thus measured becomes equal to or less than a predetermined value.

In this reclaiming method, because reclaiming is ended based on the amount of the absorbent component contained in the stored absorbent 1003, the absorbing capacity of the absorbent 1003 can be constantly maintained to a stable level.

Furthermore, in the reclaiming method according to the first embodiment, the heating further includes: allowing the absorbent 1003 to exchange heat with the steam in a non-contact manner to keep the pressure of the steam at a predetermined level (e.g., 3 [kg/cm2 G]).

In this reclaiming method, because the pressure increase in the heater is suppressed, the pressure of the steam in the heating source can be kept constant by keeping the pressure of the steam for heating the stored absorbent 1003 at a predetermined level. Therefore, the amount of the absorbent component deteriorated by the heating can be reduced, and the size of the reclaiming apparatus can also be reduced.

Example 2

A reclaiming apparatus according to a second embodiment of the present invention is applied to a recovering apparatus having the same main structures as the recovering apparatus according to the first embodiment, and some parts thereof are different from those of the reclaiming apparatus according to the first embodiment. Therefore, in the second embodiment to be explained below, an explanation about the recovering apparatus will be omitted. The structures of the reclaiming apparatus that are equivalent to those according to the first embodiment will be given the same references signs, and explanations thereof will be omitted.

Figure 6:
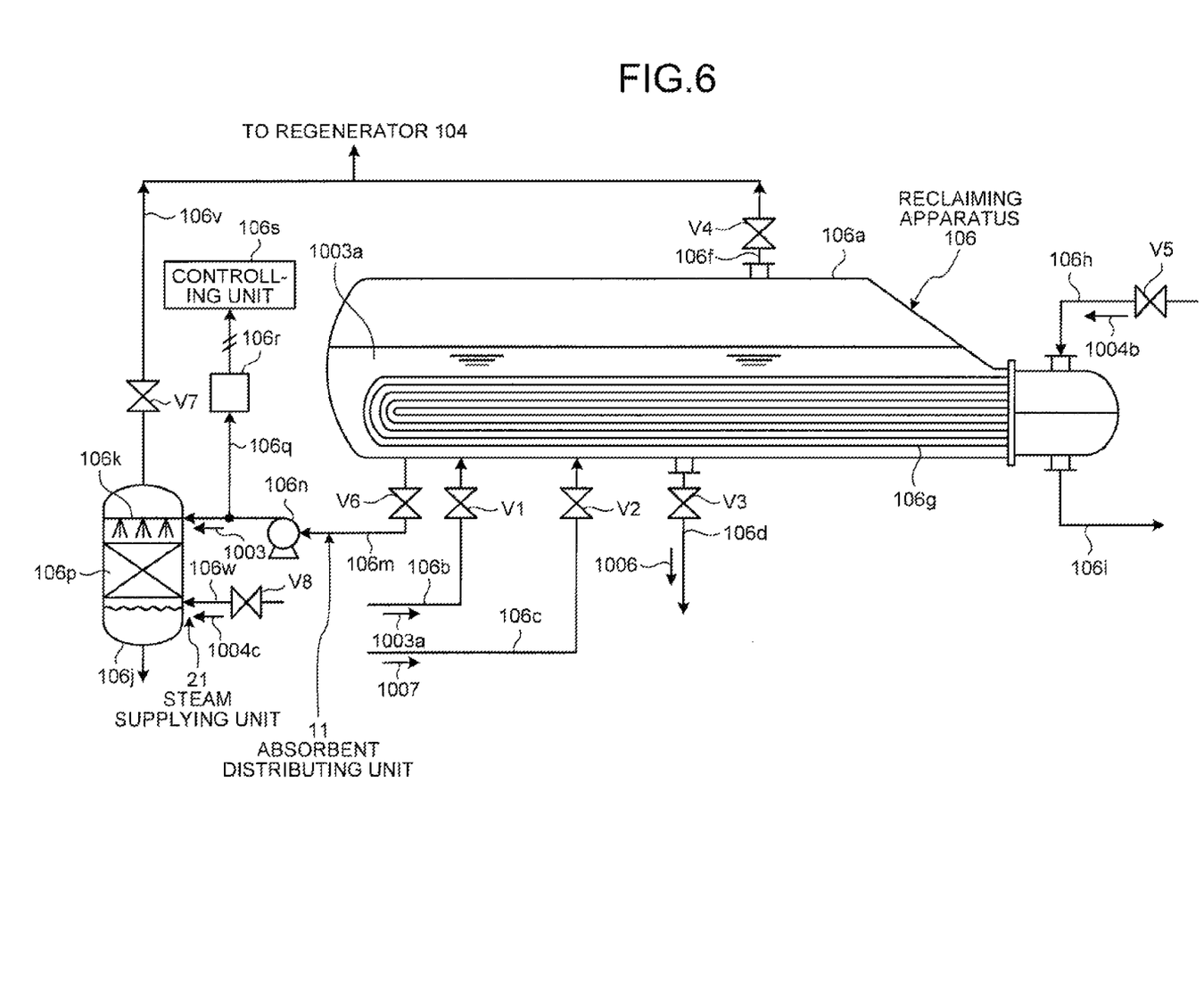
FIG. 6 is a schematic of a reclaiming apparatus according to a second embodiment of the present invention.

As shown in FIG. 6, the reclaiming apparatus 106 according to the second embodiment includes the absorbent component extracting unit 106$j$, the nozzle 106$k$, the absorbent extracting pipe 106$m$, the open and shut valve V6, the extracting pump 106$n$, the packed bed 106$p$, an absorbent ejecting pipe 106$v$, an open and shut valve V7, a steam inletting pipe 106$w$, and an open and shut valve V8.

The absorbent component extracting unit 106$j$ is a sealed container that is arranged as a separate unit from the sealed container 106$a$. The absorbent ejecting pipe 106$v$ is connected to the top of the absorbent component extracting unit 106$j$. The absorbent ejecting pipe 106$v$ is connected to the absorbent ejecting pipe 106$f$, and further to the lower area of the regenerator 104. The absorbent ejecting pipe 106$v$ includes the open and shut valve V7. The nozzle 106$k$ is arranged in the upper area of the absorbent component extracting unit 106$j$. The nozzle 106$k$ is connected to the bottom of the sealed container 106$a$ via the absorbent extracting pipe 106$m$. The open and shut valve V6 and the extracting pump 106$n$ are provided to the absorbent extracting pipe 106$m$. The packed bed 106$p$ is arranged below the nozzle 106$k$ in the absorbent component extracting unit 106$j$. The steam inletting pipe 106$w$ is connected to the lower area of the absorbent component extracting unit 106$j$ to let saturated steam 1004$c$ move into the absorbent component extracting unit 106$j$. The open and shut valve V8 is provided to the steam inletting pipe 106$w$.

The reclaiming apparatus 106 opens the open and shut valve V6 and operates the extracting pump 106$n$ to supply a part of the lean solvent 1003$a$ containing the depleted materials to the nozzle 106$k$ from the sealed container 106$a$ via the absorbent extracting pipe 106$m$, and the lean solvent 1003$a$ is injected from the nozzle 106$k$ into the absorbent component extracting unit 106$j$, and flows down in the absorbent component extracting unit 106$j$. In other words, the absorbent extracting pipe 106$m$, the open and shut valve V6, the extracting pump 106$n$, and the nozzle 106$k$ form an absorbent distributing unit 11 that extracts a part of the CO2 absorbent reserved in the sealed container 106$a$ that is an absorbent reservoir, and distributes the absorbent into the absorbent component extracting unit 106$j$.

The reclaiming apparatus 106 opens the open and shut valve V8 to guide the saturated steam 1004$c$ into the lower area of the absorbent component extracting unit 106$j$ via the steam inletting pipe 106$w$. The saturated steam 1004$c$ rises in the absorbent component extracting unit 106$j$. The rising saturated steam 104$c$ is brought into counter-current contact with the lean solvent 1003$a$ flowing down from the nozzle 106$k$ at the position of the packed bed 106$p$. In other words, the steam inletting pipe 106$w$ and the open and shut valve V8 form a steam supplying unit 21 that supplies steam into the absorbent component extracting unit 106$j$ to the direction opposing to the direction in which the absorbent distributing unit 11 distributes the absorbent 1003.

Figure 7A:
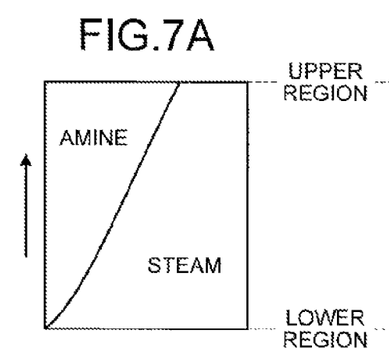
FIGS. 7A and 7B are illustrative diagrams of an effect of the reclaiming apparatus according to the second embodiment of the present invention.
Figure 7B:
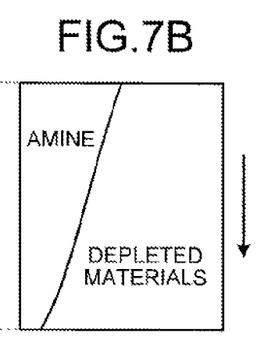

The lean solvent 1003$a$ flowing down from the nozzle 106$k$ is brought into counter-current contact with the saturated steam 1004$c$ rising in the absorbent component extracting unit 106$j$, and causes the absorbent component contained therein to volatilize. In other words, as shown in FIG. 7A, the rising steam, moving from the lower region to the upper region, is brought into counter-current contact with the absorbent 1003 (lean solvent 1003$a$) to cause the absorbent component (amine) contained in the gas to volatilize, so as to be extracted from the absorbent 1003 (lean solvent 1003$a$). As shown in FIG. 7B, the absorbent 1003 (lean solvent 1003$a$) that is flowing down moves from the upper region to the lower region, and is brought into counter-current contact with the saturated steam 1004$c$ to be volatilized, so that the absorbent component (amine) contained in the liquid is volatilized to be separated from the depleted materials. In this manner, the volatilized absorbent component is separated from the depleted materials, passes through the opened open and shut valve V7, is transported through absorbent ejecting pipe 106$v$, and returns to the regenerator 104.

The packed bed 106$p$ is suited for bringing the lean solvent 1003$a$ flowing down from the nozzle 106$k$ into gas-liquid contact with the rising saturated steam 1004$c$ so that the absorbent component is volatilized to be separated from the depleted materials. An example of the packed bed 106$p$ includes a packed bed structure filled with fillers such as ball rings or cascade rings. The packed bed 106$p$ is preferably included in the reclaiming apparatus 106; however, even without the packed bed 106$p$, the absorbent component can be separated from the depleted materials by bringing the lean solvent 1003$a$ flowing down from the nozzle 106$k$ into counter-current contact with the rising saturated steam 1004$c$.

The reclaiming apparatus 106 according to the second embodiment also includes the collecting unit 106$q$ that collects (samples) a part of the absorbent 1003 (lean solvent 1003$a$) that is stored in the sealed container 106$a$. The collecting unit 106$q$ is connected to the absorbent extracting pipe 106$m$, at a position following the extracting pump 106$n$. The collecting unit 106$q$ includes the measuring unit 106$r$ that measures the amount of the absorbent component contained in the collected absorbent 1003 (lean solvent 1003$a$). The measurement information measured by the measuring unit 106$r$ is output to the controlling unit 106$s$. The collecting unit 106$q$ may also collect the samples of the absorbent 1003 (lean solvent 1003a) from the sealed container 106a, instead of via the absorbent extracting pipe 106m.

Figure 8:
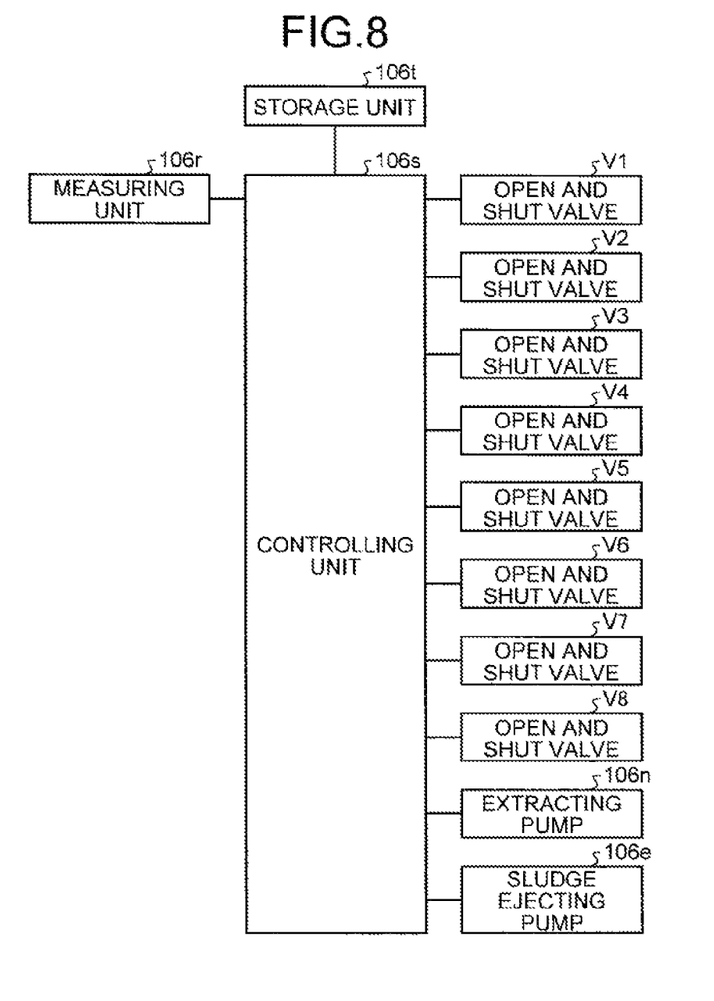
FIG. 8 is a block diagram of a controlling system included in the reclaiming apparatus according to the second embodiment of the present invention.

The controlling unit 106s is, for example, a microcomputer. As shown in FIG. 8, the storage unit 106t is provided to the controlling unit 106s. The storage unit 106t is, for example, a RAM or a ROM, and stores therein programs and data. To operate the reclaiming apparatus, the storage unit 106t stores therein data of the amount of an absorbent component contained in the absorbent 1003 (lean solvent 1003a) stored in the sealed container 106a. For example, the data specifies the amount of the absorbent component contained in the absorbent 1003 (lean solvent 1003a) to be 5 weight percent. This setting functions as an index indicating how much absorbent component has decreased in the absorbent 1003 (lean solvent 1003a) stored in the sealed container 106a, and can be set to any value. The controlling unit 106s is connected to the measuring unit 106r, the open and shut valves V1 to V8, and the pumps 106e and 106n. The controlling unit 106s controls the overall operations of the open and shut valves V1 to V8 and the pumps 106e and 106n, based on concentration information received from the measuring unit 106r and according to the programs and the data stored in the storage unit 106t in advance.

Figure 9:
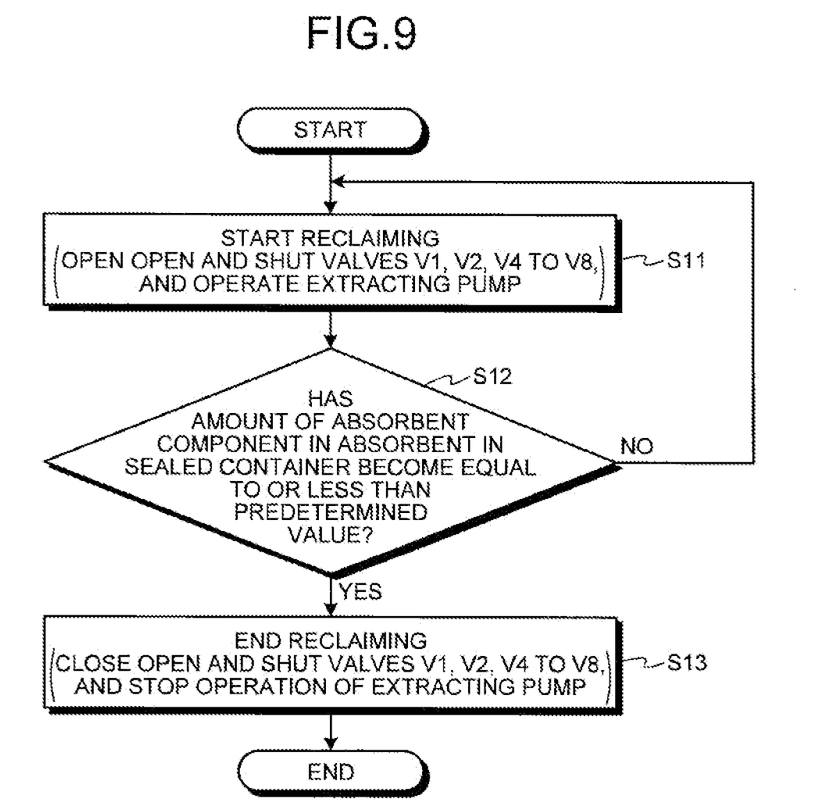
FIG. 9 is a flowchart of a control performed by the reclaiming apparatus according to the second embodiment of the present invention.

As shown in FIG. 9, the controlling unit 106s opens the open and shut valves V1, V2, and V4 to V8, and operates the extracting pump 106n, based on a reclaiming initiating command (Step S11). By way of these operations, a part of the absorbent 1003 (lean solvent 1003a) is transported from the regenerator 104 to the sealed container 106a to be stored therein, heated to volatilize together with the diluting water 1007, and returned to the regenerator 104 via the absorbent ejecting pipe 106f. The absorbent 1003 (lean solvent 1003a) stored in the sealed container 106a flows down from the nozzle 106k, and is volatilized while being brought into counter-current contact with the saturated steam 1004c rising in the absorbent component extracting unit 106j. The absorbent 1003 (lean solvent 1003a) is then returned to the regenerator 104 via the absorbent ejecting pipe 106v. As a result, the absorbent component can be separated and extracted from the depleted materials. Based on the measurement information received from the measuring unit 106r, when the amount of the absorbent component contained in the absorbent 1003 (lean solvent 1003a) stored in the sealed container 106a becomes equal to or less than a predetermined value (e.g., 5 weight percent) (Yes at Step S12), the controlling unit 106s closes the open and shut valves V1, V2, and V4 to V8, and stops the extracting pump 106n to end the reclaiming (Step S13). After ending the reclaiming, the controlling unit 106s opens the open and shut valve V3, and operates the sludge ejecting pump 106e, to eject the sludge 1006 out of the sealed container 106a.

As described above, the reclaiming apparatus 106 according to the second embodiment includes: the sealed container 106a that is the absorbent reservoir for storing therein a part of the absorbent 1003 that has absorbed $CO_2$ contained in the flue gas 1001; and the heater that heats the absorbent 1003 stored in the sealed container 106a. A part of the absorbent 1003 stored in the sealed container 106a is distributed and brought into counter-current contact with the steam.

In this reclaiming apparatus 106, because a part of the absorbent 1003 stored in the sealed container 106a is brought into counter-current contact with the steam, the absorbent component volatilizes to be separated from the depleted materials. In this manner, the absorbent component can be extracted from the depleted materials, to reduce a loss of the absorbent 1003.

A general reclaiming apparatus starts heating the absorbent 1003 at approximately 120 degrees Celsius, and the temperature is increased to, for example, 150 degrees Celsius, depending on a concentrating frequency of the depleted materials. Therefore, the pressure of the steam to be passed through the steam pipe 106g that is the heater must be increased, thus requiring a higher pressure steam at the heating source. Furthermore, alkanolamine that is the absorbent component in the absorbent 1003 may deteriorate due to the heat accompanying the increase in the heating temperature. To address such an issue, the reclaiming apparatus 106 according to the second embodiment brings the absorbent 1003 stored in the sealed container 106a into counter-current contact with the steam to separate the absorbent component from the depleted materials, and to cause the depleted materials to be concentrated. In this manner, the heating temperature required for concentrating the depleted materials can be suppressed, and the pressure increase in the heater can also be suppressed. Therefore, the pressure of the steam in the heating source can also be suppressed. Moreover, because the heating temperature can be suppressed, the amount of the absorbent component deteriorated by the heating can also be reduced. Furthermore, because the depleted materials can be concentrated at the lower heating temperature in the heater, the depleted materials are allowed to concentrate more efficiently, and thus the size of the reclaiming apparatus 106 can be reduced.

Furthermore, the reclaiming apparatus 106 according to the second embodiment includes: the absorbent distributing unit 11 that extracts a part of the absorbent 1003 stored in the sealed container 106a; the steam supplying unit 21 that supplies the steam generated outside of the reclaiming apparatus; and the absorbent component extracting unit 106j that brings the absorbent 1003 extracted by the absorbent distributing unit 11 into counter-current contact with the steam generated by the steam supplying unit 21.

Unlike the one according to the first embodiment, the reclaiming apparatus 106 uses the saturated steam 1004c generated outside of the reclaiming apparatus 106, that is the steam not containing amine that is the absorbent component. In this manner, the absorbent component can be separated from the depleted materials more efficiently.

Furthermore, the reclaiming apparatus 106 according to the second embodiment further includes the packed bed 106p in which the absorbent 1003 distributed by the absorbent distributing unit 1 is brought into gas-liquid contact with the steam.

This reclaiming apparatus 106 can further promote the separation of the absorbent component from the depleted materials contained in the absorbent 1003.

Furthermore, in the reclaiming apparatus 106 according to the second embodiment, the absorbent distributing unit 11 includes: the extracting pump 106n that extracts and pumps up a part of the absorbent 1003 from the seated sealed container 106a; and the nozzle 106k that allows the absorbent 1003 pumped up by the extracting pump 106n to flow down and be brought into counter-current contact with the rising steam.

In this reclaiming apparatus 106, the absorbent 1003 stored in the sealed container 106a can be brought into counter-current contact with the steam as required.

Furthermore, the reclaiming apparatus 106 according to the second embodiment further includes: the measuring unit 106r that measures the amount of the absorbent component contained in the absorbent 1003 stored in the sealed container 106a; and the controlling unit 106s that ends reclaiming when the amount of the absorbent component received from the measuring unit 106r becomes equal to or less than a predetermined value.

In the reclaiming apparatus 106, because reclaiming is ended based on the amount of the absorbent component contained in the absorbent 1003 stored in the sealed container 106a, the absorbing capacity of the absorbent 1003 can be constantly maintained at a stable level.

Upon starting reclaiming, in the reclaiming apparatus 106, the open and shut valves V1, V2, and V4 to V6 are opened, and the extracting pump 106n is operated. Therefore, the absorbent 1003 (lean solvent 1003a) can be heated to evaporate, while the absorbent component is volatilized. Therefore, the reclaiming efficiency can be improved.

Alternatively, upon starting reclaiming, in the reclaiming apparatus 106, the open and shut valves V1, V2, V4, and V5 may be opened at first to heat and cause the absorbent 1003 (lean solvent 1003a) to evaporate; and then the open and shut valves V6 to V8 may be opened and the extracting pump 106n may be operated to cause the absorbent component to volatilize. In this manner, the heat stable salts are concentrated so that the absorbent 1003 (lean solvent 1003a) containing 30-weight percent of the absorbent component at the time of heating can be concentrated into the absorbent 1003 containing 5-weight percent of the absorbent component, for example, and then the concentrated absorbent 1003 is brought into counter-current contact with the steam. Thus, the amount of the volatilized absorbent component can be increased so that the absorbent component can be separated from the depleted materials more efficiently.

A reclaiming method according to the second embodiment includes: storing a part of the absorbent 1003 that has absorbed $CO_2$ contained in the flue gas 1001 in the sealed container 106a; heating the stored absorbent 1003; and distributing a part of the stored absorbent 1003 to bring the stored part of the absorbent 1003 into counter-current contact with steam.

In this reclaiming method, because the part of the stored absorbent 1003 is brought into counter-current contact with the steam, the absorbent component volatilizes and becomes separated from the depleted materials. In this manner, the absorbent component can be extracted from the depleted materials. Therefore, a loss of the absorbent 1003 can be reduced.

In a general reclaiming method, heating of the absorbent 1003 is started approximately at 120 degrees Celsius, and the temperature is increased to, for example, 150 degrees Celsius depending on a concentrating frequency of the depleted materials. Therefore, the pressure of the steam to be passed through the steam pipe 106g that is the heater must be increased, thus requiring a higher pressure steam at the heating source. Furthermore, alkanolamine that is the absorbent component in the absorbent 1003 may deteriorate due to the heat accompanying the increase in the heating temperature. To address such an issue, in the reclaiming method according to the second embodiment, the stored absorbent 1003 is brought into counter-current contact with the steam to separate the absorbent component from the depleted materials, so that the depleted materials are concentrated. In this manner, the heating temperature required for concentrating the depleted materials can be suppressed, and the pressure increase in the heater can also be suppressed. Therefore, the pressure of the steam in the heating source can also be suppressed. Moreover, because the heating temperature can be suppressed, the amount of the absorbent component deteriorated by the heating can also be reduced. Furthermore, because the depleted materials can be concentrated at the lower heating temperature in the heater, the depleted materials are allowed to concentrate more efficiently, and thus the size of the reclaiming apparatus 106 can be reduced.

The reclaiming method according to the second embodiment further includes: extracting and distributing a part of the stored absorbent 1003; and bringing the extracted absorbent 1003 into counter-current contact with the saturated steam 1004c generated externally.

Unlike the one according to the first embodiment, in the reclaiming method according to the second embodiment, the saturated steam 1004c generated outside of the reclaiming apparatus 106, that is the steam not containing amine that is the absorbent component, is used. In this manner, the absorbent component can be separated from the depleted materials more efficiently.

The reclaiming method according to the second embodiment further includes: sampling the stored absorbent 1003 to measure the amount of the absorbent component contained therein; and ending reclaiming when the content of the absorbent component thus measured becomes equal to or less than a predetermined value.

In this reclaiming method, because reclaiming is ended based on the amount of the absorbent component contained in the stored absorbent 1003, the absorbing capacity of the absorbent 1003 can be constantly maintained at a stable level.

Furthermore, in the reclaiming method according to the second embodiment, the heating further includes: allowing the absorbent 1003 to exchange heat with the steam in a non-contact manner to keep the pressure of the steam at a predetermined level (e.g., 3 [kg/cm2 G]).

In this reclaiming method, because the pressure increase in the heater is suppressed, the pressure of the steam in the heating source can be kept constant by keeping the pressure of the steam for heating the stored absorbent 1003 at a predetermined level. Therefore, the amount of the absorbent component deteriorated by the heating can be reduced, and the size of the reclaiming apparatus can also be reduced.

In the first and the second embodiment, the recovering apparatus is explained that recovers $CO_2$ (carbon dioxide) contained combustion flue gas (flue gas). As described above, coal-gasified gas, synthesis gas, coke-oven gas, petroleum gas, natural gas, and the like also contain $H_2S$ (hydrogen sulfide). The reclaiming apparatus and the reclaiming method may also be applied to a case in which the absorbent absorbs $H_2S$ (hydrogen sulfide).

In the first and the second embodiment, it is preferable to bring the absorbent flowing down into counter-current contact with the rising steam; however, the direction in which the absorbent is brought into counter-current contact with the rising steam is not limited to vertical direction, and may be lateral or diagonal. Furthermore, in the counter-current contact, the steam is brought into contact in an opposing direction to the direction the absorbent is distributed and the steam may not necessarily be in the direction directly opposite to the direction in which the absorbent is distributed.

Example

Figure 10:
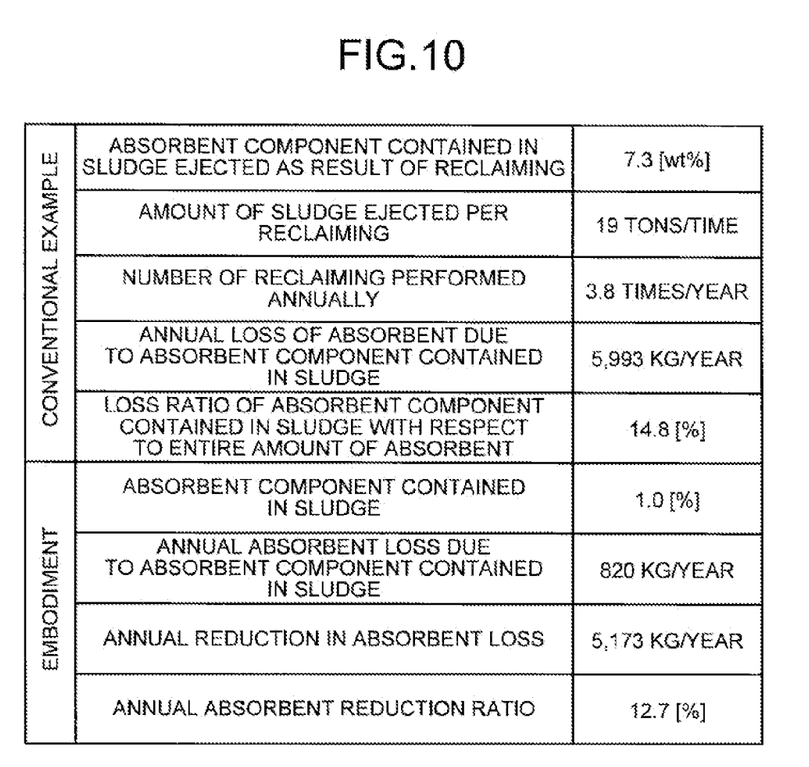
FIG. 10 is a chart indicating reclaiming results of a test performed on an example of the present invention.

In the present example, a test was conducted on an absorbent component contained in sludge that is a concentrated waste ejected as a result of reclaiming (see FIG. 10).

The test indicated that, in a conventional facility, in which the reclaiming apparatus described above was not applied, the content of the absorbent component contained in the sludge ejected as a result of reclaiming was 7.3 weight percent. In this recovering apparatus, reclaiming is performed a few times over a year, and 19 tons of the sludge was ejected every time the reclaiming is performed. Actually, the reclaiming was performed 3.8 times per year. The annual loss of the absorbent due to the absorbent component being contained in the sludge was 5,993 kilograms, and a loss ratio of the absorbent component contained in the sludge over the entire amount of the absorbent was 14.8 percent.

The reclaiming apparatus described above is applied to the example, and the content of the absorbent component contained in the sludge was 1.0 percent. The annual loss of the absorbent due to the absorbent component being contained in the sludge was 820 kilograms. In this manner, the annual loss of the absorbent was reduced by 5,173 kilograms, and the annual absorbent reduction ratio was 12.7 percent.

As a result, as shown in FIG. 10, the example indicated that the loss of the absorbent can be reduced by further separating the absorbent component from the depleted materials.

INDUSTRIAL APPLICABILITY

As described above, the reclaiming apparatus and the reclaiming method according to the present invention is suited for further separating the absorbent component from the depleted materials to reduce a loss of the absorbent.

REFERENCE SIGNS LIST 1, 11 absorbent distributing unit
2, 21 steam supplying unit
101 industrial facility
102 cooler
102a flue gas blower
102b humidifying cooling water circulating pump
102c cooling water pipe
102d cooling unit
102e flue gas pipe
103 absorber
103a absorbent supplying pump
103b lean solvent pipe
103c cooling unit
104 regenerator
104a absorbent ejecting pump
104b rich solvent pipe
104c regenerating heater
104d circumfluent water pump
104e circumfluent pipe
104f regenerator circumfluent cooling unit
104g $CO_2$ separator
104h recovered $CO_2$ releasing pipe
105 rich/lean heat exchanger
106 reclaiming apparatus
106a sealed container
106b extracting pipe
106c water supplying pipe
106d sludge ejecting pipe
106e sludge ejecting pump
106f absorbent ejecting pipe
106g steam pipe
106h steam supplying pipe
106i steam ejecting pipe
106j absorbent component extracting unit
106k nozzle
106m absorbent extracting pipe
106n extracting pump
106p packed bed
106q collecting unit
106r concentration measuring unit
106s controlling unit
106t storage unit
106v absorbent ejecting pipe
106w steam inletting pipe
1001 flue gas
1002 cooling water
1003 $CO_2$ absorbent
1003a lean solvent
1003b rich solvent
1004a, 1004b, 1004c saturated steam
1005 circumfluent water
1006 sludge
1007 diluting water
V1, V2, V3, V4, V5, V6, V7, V8 open and shut valve

The invention claimed is:

1. A reclaiming method comprising:
storing a part of an absorbent that has absorbed $CO_2$ or $H_2S$ in gas;
heating the absorbent thus stored; and
distributing and bringing the part of the absorbent thus stored into counter-current contact with steam.

2. The reclaiming method according to claim 1, further comprising:
circulating a part of the absorbent thus stored to distribute the absorbent; and
bringing the absorbent thus circulated into counter-current contact with steam generated by heating the absorbent.

3. The reclaiming method according to claim 1, further comprising:
extracting and distributing a part of the absorbent thus stored; and
brining the absorbent thus extracted into counter-current contact with steam generated externally.

4. The reclaiming method according to claim 1, further comprising:
measuring an amount of an absorbent component contained in the absorbent by sampling the stored absorbent; and
ending each of the preceding steps when the amount of the absorbent component thus measured becomes equal to or less than a predetermined value.

5. The reclaiming method according to claim 1, wherein the heating further comprises allowing the absorbent and steam to exchange heat in a non-contact manner to maintain a pressure of the steam to a predetermined level.

* * * * *